United States Patent
Cheng et al.

(10) Patent No.: US 8,654,621 B2
(45) Date of Patent: Feb. 18, 2014

(54) DATA RECOVERY METHOD AND ASSOCIATED DEVICE

(75) Inventors: Yen-Chien Cheng, Hsinchu (TW);
Yung-Chi Yang, Hsinchu (TW);
Zheng-Xiong Chen, Changhua County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 117 days.

(21) Appl. No.: 13/303,322

(22) Filed: Nov. 23, 2011

(65) Prior Publication Data
US 2012/0221925 A1    Aug. 30, 2012

(30) Foreign Application Priority Data
Feb. 24, 2011    (TW) .............................. 100106290 A (51) Int. Cl.
*G11B 5/09*    (2006.01)
(52) U.S. Cl.
USPC ........................ 369/59.21; 714/769
(58) Field of Classification Search
USPC ................... 369/59.21, 59.15, 53.35, 124.05; 714/769
See application file for complete search history.

(56) References Cited

U.S. PATENT DOCUMENTS

| | | | |
|---|---|---|---|
| 6,324,144 B1 * | 11/2001 | Won et al. ................. | 369/59.15 |
| 6,693,863 B2 * | 2/2004 | Shoji et al. ................. | 369/47.35 |
| 6,798,363 B2 * | 9/2004 | Rapp ............................. | 341/59 |
| 7,652,961 B2 * | 1/2010 | Kakimoto et al. ........... | 369/47.5 |
| 7,715,295 B2 * | 5/2010 | Lee et al. ..................... | 369/59.22 |
| 7,724,636 B2 * | 5/2010 | Tseng et al. ............... | 369/124.1 |
| 8,194,518 B2 * | 6/2012 | Yamakawa ................. | 369/59.23 |
| 2002/0172112 A1 * | 11/2002 | Shoji et al. ................. | 369/47.35 |
| 2005/0058048 A1 * | 3/2005 | Park et al. ................... | 369/59.17 |
| 2005/0083822 A1 * | 4/2005 | Park et al. ................... | 369/59.27 |
| 2005/0128916 A1 * | 6/2005 | Park et al. ................... | 369/59.21 |
| 2005/0128918 A1 * | 6/2005 | Park et al. ................... | 369/60.01 |
| 2005/0180298 A1 * | 8/2005 | Horibe et al. .............. | 369/124.1 |
| 2007/0104065 A1 * | 5/2007 | Katayama ................. | 369/53.35 |
| 2007/0206476 A1 * | 9/2007 | Cho et al. ................... | 369/59.21 |
| 2009/0185468 A1 * | 7/2009 | Sakai et al. ............... | 369/53.35 |

\* cited by examiner

*Primary Examiner* — Brenda Bernardi
(74) *Attorney, Agent, or Firm* — WPAT, PC; Justin King (57) ABSTRACT

A data recovery method includes the following steps. Firstly, plural sampling values are classified into a first group, a second group, a third group and a fourth group. A first channel estimation value and a second channel estimation value are generated according to the sampling values of the second group and the third group. A judging step is performed to judge whether a first sampling value of the first group is lower than the first channel estimation value or a second sampling value of the fourth group is higher than the second channel estimation value. If the judging condition is satisfied, a polarity of the first sampling value or the second sampling value is changed and then the plural sampling values are outputted. If the judging condition is not satisfied, the plural sampling values are directly outputted.

7 Claims, 7 Drawing Sheets

DATA RECOVERY METHOD AND ASSOCIATED DEVICE

This application claims the benefit of Taiwan Patent Application No. 100106290, filed Feb. 24, 2011, the subject matter of which is incorporated herein by reference.

FIELD OF THE INVENTION

The present invention relates to a data recovery method and associated device, and more particularly to a RF data recovery method and associated device for use in an optical disc drive.

BACKGROUND OF THE INVENTION

In an optical storage system, after a light spot emitted by an optical pickup head is irradiated on lands and pits of the tracks of an optical disc, a light beam reflected from the optical disc is received by a photo detector IC (PDIC). According to the reflected light beam, the photo detector IC generates a radio frequency signal (RF). After the radio frequency signal is processed by a read channel of the optical storage system, a sliced radio frequency signal (SLRF) indicative of the data of the optical disc and a channel clock (PLCK) are acquired.

Figures 1A, 1B:
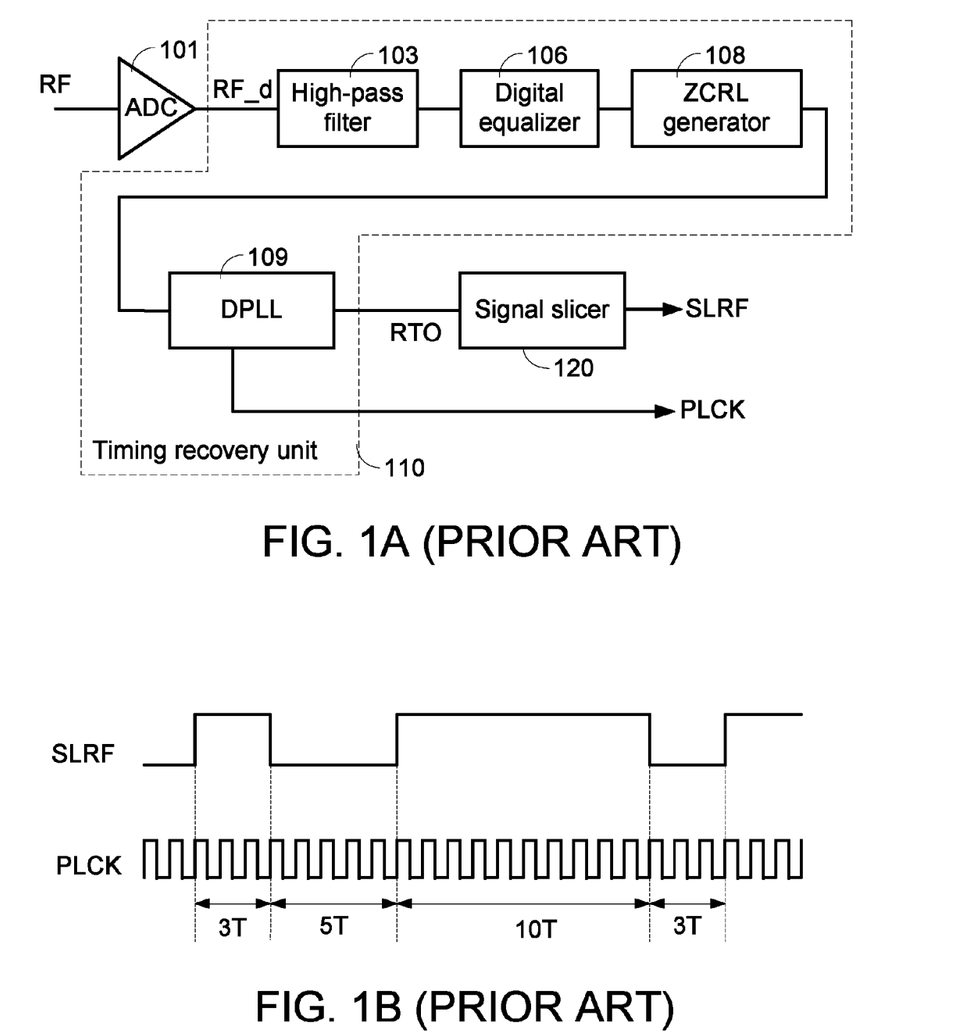
FIG. 1A (Prior Art) is a schematic functional block diagram illustrating a read channel of an optical storage system according to the prior art.
FIG. 1B (Prior Art) is a schematic timing waveform diagram illustrating the channel clock PLCK and the sliced RF signal SLRF processed in the read channel of the optical storage system.

FIG. 1A is a schematic functional block diagram illustrating a read channel of an optical storage system according to the prior art. As shown in FIG. 1A, the read channel comprises an analog-to-digital converter (ADC) 101, a timing recovery unit 110 and a signal slicer 120. The timing recovery unit 110 comprises a high-pass filter (HPF) 103, a digital equalizer (EQ) 106, a zero-crossing reference level generator 108, and a digital phase locked loop circuit (DPLL) 109.

Since the read channel of the optical storage system is implemented by a digital signal processing circuit, the radio frequency signal RF outputted from the optical pickup head should be sampled by the analog-to-digital converter 101. That is, the radio frequency signal RF should be converted into a digital radio frequency signal RF_d. After the digital radio frequency signal RF_d is inputted into the timing recovery unit 110, the DC component of the digital radio frequency signal RF_d is filtered off by the high-pass filter 103, then the gains of various frequency values are adjusted by the digital equalizer 106. A gain adjusted signal generated by the digital equalizer is inputted to the ZCRL generator 108 to generates a zero-crossing reference level ZCRL. The digital phase locked loop circuit DPLL 109 generates a re-timing output signal RTO and a channel clock PLCK in response to the gain adjusted signal and the zero-crossing reference level ZCRL.

The re-timing output signal RTO is further received by the signal slicer 120. Moreover, according to a slice level (SL), the signal slicer 120 generates a sliced radio frequency signal SLRF indicative of the data of the optical disc. The signal slicer 120 is usually referred as a Viterbi decoder or a partial response maximum likelihood circuit (PRML circuit).

FIG. 1B is a schematic timing waveform diagram illustrating the channel clock PLCK and the sliced radio frequency signal SLRF processed in the read channel of the optical storage system. As shown in FIG. 1B, in a case that the pulse period of the channel clock PLCK is T, the sliced radio frequency signal SLRF includes a plurality of successive pulses with the lengths 3T, 5T, 10T, 3T. After the sliced radio frequency signal SLRF is decoded by a subsequent decoding circuit (not shown), the data of the optical data are realized.

Take a DVD disc for example. The track of the DVD disc has land and pit lengths of 3T to 14T. During the process of burning or imprinting the lands and pits, if some problems occur, the sliced radio frequency signal SLRF may be erroneously written. The above erroneous situations usually occur at the short-T parts. The short-T parts indicate the pulses with the lengths 3T, 4T or 5T. Whereas, the pulses with the length longer than 5T are denoted as the long-T parts. Generally, the pulse with the length 3T has the most possibility to incur the erroneous situations.

Figure 2A:
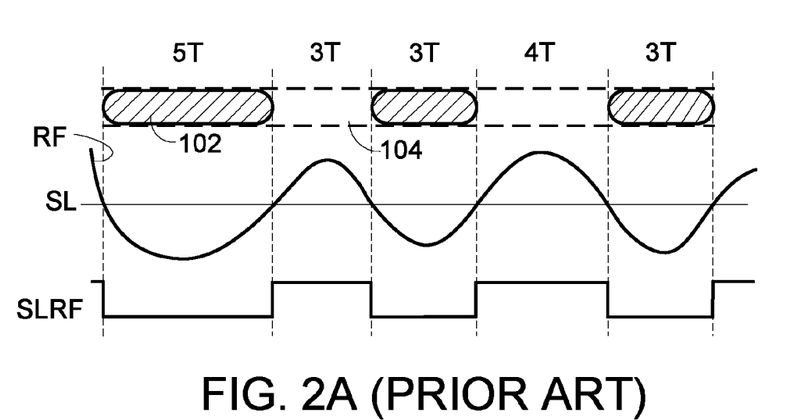
FIG. 2A (Prior Art) schematically illustrates associated signals of an optical disc with a land-pit symmetry configuration.

FIG. 2A schematically illustrates associated signals of an optical disc with a pit-land symmetry configuration. As shown in FIG. 2A, alternate pits 102 and lands 104 of the track have lengths of 5T, 3T, 3T, 4T and 3T, respectively. For an ideal optical disc, for example a ROM disc to be imprinted by a mold or a recordable disc to be burned by laser, the land and the pit with the same length are symmetric. For example, as shown in FIG. 2A, the lengths of the 3T land and the 3T pit are identical. The optical disc with the land-pit symmetry configuration is also referred as a symmetry disc or an ideal etching disc.

In a case that the track of the optical disc has the land-pit symmetry configuration, the radio frequency signal RF is vertically symmetrical with respect to the slice level SL. Moreover, according to the slice level SL, the sliced radio frequency signal SLRF indicative of the data of the optical disc is generated.

Figure 2B:
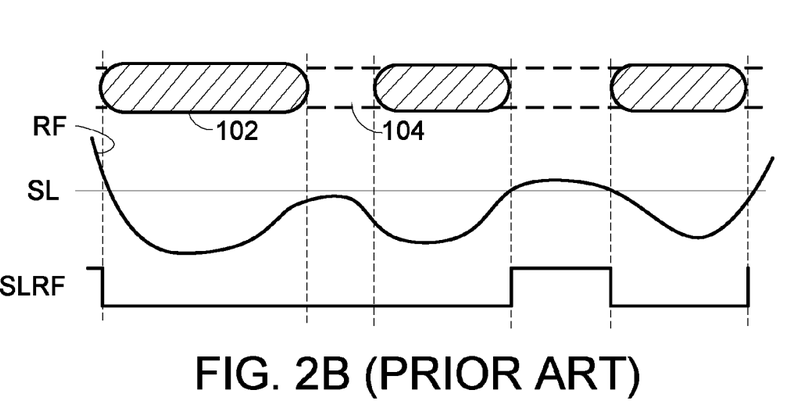
FIG. 2B (Prior Art) schematically illustrates associated signals of an optical disc with a negative asymmetrical configuration.

FIG. 2B schematically illustrates associated signals of an optical disc with a negative asymmetrical configuration. Similarly, alternate pits 102 and lands 104 of the track have lengths of 5T, 3T, 3T, 4T and 3T, respectively. If the mold is frequently used in this type of optical disc, the length of the pit becomes longer than the length of the land. Otherwise, if the laser power for burning the optical disc is too high, the length of the pit becomes longer than the length of the land. For example, as shown in FIG. 2B, the length of the 3T pit is longer than the length of the 3T land. This optical disc is also referred as a negative symmetry disc or an over-etching disc.

In a case that the track of the optical disc has the negative asymmetrical configuration, a negative DC offset is induced in the radio frequency signal RF causing the slice level SL not properly slicing the radio frequency signal RF. Under this circumstance, the short-T part (e.g. the 3T or 4T part) is possibly lower than the slice level SL, and thus the sliced radio frequency signal SLRF may be erroneous. For example, as shown in FIG. 2B, the 3T part of the sliced radio frequency signal SLRF fails to be actually sliced.

Figure 2C:
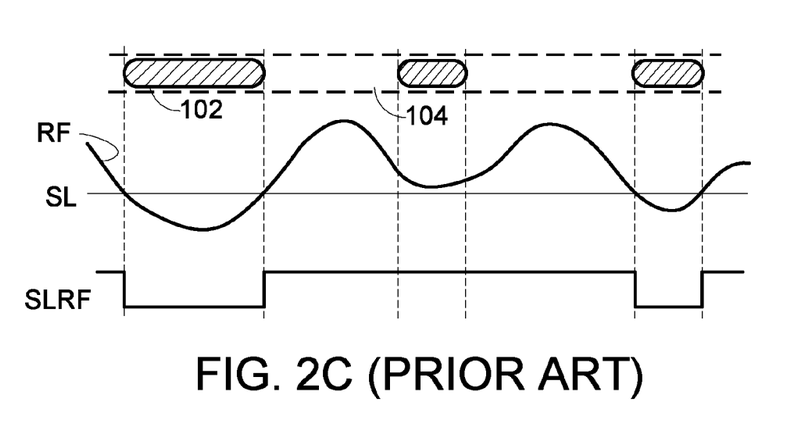
FIG. 2C (Prior Art) schematically illustrates associated signals of another optical disc with a positive asymmetrical configuration.

FIG. 2C schematically illustrates associated signals of another optical disc with a positive asymmetrical configuration. Similarly, alternate pits 102 and lands 104 of the track have lengths of 5T, 3T, 3T, 4T and 3T, respectively. If the mold is frequently used in this type of optical disc, the length of the pit becomes shorter than the length of the land. For example, as shown in FIG. 2C, the length of the 3T pit is shorter than the length of the 3T land. This optical disc is also referred as a positive asymmetry disc or an under-etching disc.

In a case that the track of the optical disc has the positive asymmetrical configuration, a positive DC offset is induced in the radio frequency signal RF causing the slice level SL not properly slicing the radio frequency signal RF. Under this circumstance, the short-T part (e.g. the 3T or 4T part) is possibly higher than the slice level SL, and thus the sliced radio frequency signal SLRF may be erroneous. For example, as shown in FIG. 2C, the 3T part of the sliced radio frequency signal SLRF fails to be actually sliced.

From the above discussions, the defects in the pits 102 and the lands 104 of the track may result in asymmetry of the sliced radio frequency signal SLRF, and thus the possibility of causing the erroneous sliced radio frequency signal SLRF increases.

Figure 3:
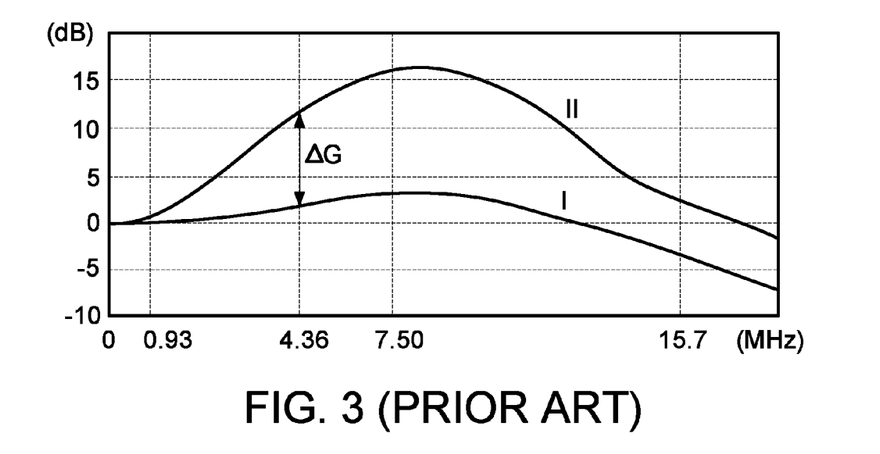
FIG. 3 (Prior Art) schematically illustrates an approach of using the digital equalizer to adjust the symmetric property of the radio frequency signal RF. according to the prior art.

For achieving a better symmetric property of the radio frequency signal RF, the digital equalizer 106 of the read channel is employed to adjust the gain of the short-T part. FIG. 3 schematically illustrates an approach of using the digital equalizer to adjust the symmetric property of the radio frequency signal RF according to the prior art. Take a DVD disc at 1× speed for example. The frequency of the 3T-14T parts is in the range between 4.36 MHz and 0.93 MHz. In particular, the frequency of the 3T part is 4.36 MHz, and the frequency of the 14T part is 0.93 MHz.

Normally, the gain function of the digital equalizer 106 is expressed by the curve I. As the gain of the curve I at the 4.36 MHz is increased, the amplitude of the 3T part is suitably amplified to enhance the symmetry of the radio frequency signal RF. Moreover, if the 3T part of the radio frequency signal RF has inferior symmetry, the gain function is adjusted to the curve II. Obviously, although the gain increase AG at the 4.36 MHz is effective to amplify the amplitude of the 3T part. However, according to the curve II, the gains of 4T~14T parts are also increased causing the radio frequency signal RF suffering from distortion.

Figure 4:
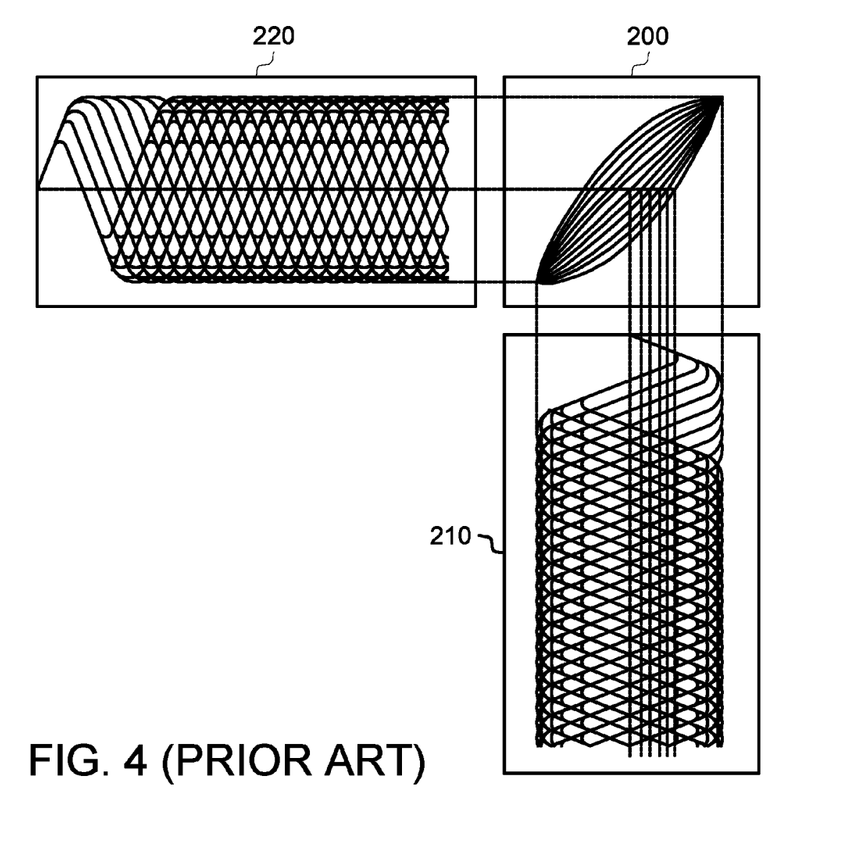
FIG. 4 (Prior Art) schematically illustrates an approach of using an asymmetrical compensator to adjust the symmetric property of the radio frequency signal RF according to the prior art.

FIG. 4 schematically illustrates an approach of using an asymmetrical compensator to adjust the symmetric property of the radio frequency signal RF according to the prior art. In this approach, an asymmetrical compensator (not shown) is arranged between the analog-to-digital converter 101 and the high-pass filter 103 to receive an asymmetrical radio frequency signal RF and convert the asymmetrical radio frequency signal RF into a symmetrical radio frequency signal RF. In a case that an asymmetrical radio frequency signal having an asymmetrical eye diagram 210 is inputted, by using a compensation curve 200 of the asymmetrical compensator, the asymmetrical compensator may output a symmetrical radio frequency signal having a symmetrical eye diagram 220. In other words, the use of the asymmetrical compensator can compensate the shift of the short-T part. However, the long-T part fails to be effectively compensated by the asymmetrical compensator and the back-end digital circuit needs to be re-designed.

SUMMARY OF THE INVENTION

Therefore, the present invention relates to a data recovery method and a data recovery device for use with an optical storage system. The data recovery method and a data recovery device are effective to adjust the asymmetric short-T part (e.g. 3T, 4T or 5T part) to more symmetrical and enhance the accuracy of the sliced radio frequency signal SLRF without adversely affecting the long-T part of the radio frequency signal RF.

An embodiment of the present invention provides a data recovery method for receiving a plurality of sampling values from a timing recovery unit of a read channel. The data recovery method includes the following steps. Firstly, the plurality of sampling values are classified into a first group, a second group, a third group and a fourth group. Then, a first channel estimation value is generated according to the sampling values of the second group, and a second channel estimation value is generated according to the sampling values of the third group. A judging step is performed to judge whether a first sampling value of the first group is lower than the first channel estimation value or a second sampling value of the fourth group is higher than the second channel estimation value. If the first sampling value of the first group is lower than the first channel estimation value or the second sampling value of the fourth group is higher than the second channel estimation value, a polarity of the first sampling value or the second sampling value is changed and then the plurality of sampling values are outputted. Whereas, if the first sampling value of the first group is higher than or equal to the first channel estimation value or the second sampling value of the fourth group is lower than or equal to the second channel estimation value, the plurality of sampling values are directly outputted.

Another embodiment of the present invention provides a data recovery device for receiving a plurality of sampling values of a re-timing output signal from a timing recovery unit of a read channel. The data recovery device includes a re-timing data mapping unit and a channel estimation unit. The re-timing data mapping unit is used for classifying the plurality of sampling values into a first group, a second group, a third group and a fourth group. The channel estimation unit is used for generating a first channel estimation value according to the sampling values of the second group, and generating a second channel estimation value according to the sampling values of the third group. The re-timing data mapping unit judges whether a first sampling value of the first group is lower than the first channel estimation value or a second sampling value of the fourth group is higher than the second channel estimation value. If the judging condition is satisfied, a polarity of the first sampling value or the second sampling value is changed and then the plurality of sampling values are outputted as an adjusted re-timing output signal. If the judging condition is not satisfied, the plurality of sampling values are directly outputted as the adjusted re-timing output signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 5:
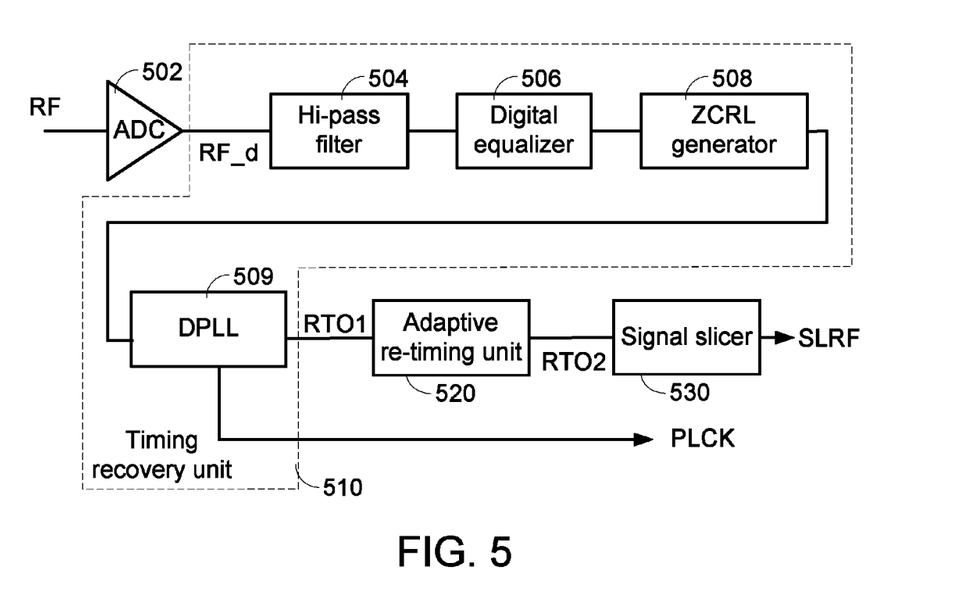
FIG. 5 is a schematic functional block diagram illustrating a read channel of an optical storage system according to an embodiment of the present invention.

FIG. 5 is a schematic functional block diagram illustrating a read channel of an optical storage system according to an embodiment of the present invention. As shown in FIG. 5, the read channel comprises an analog to an analog-to-digital converter (ADC) 502, a timing recovery unit 510, an adaptive re-timing unit 520 and a signal slicer 530. The timing recovery unit 510 comprises a hi-pass filter 504, a digital equalizer 506, a zero-crossing reference level generator 508 and a digital phase locked loop circuit 509. A re-timing output signal RTO1 is outputted from the timing recovery unit 510. In response to the re-timing output signal RTO1, the adaptive re-timing unit 520 generates an adjusted re-timing output signal RTO2 to the back-end signal slicer 530. By the adaptive re-timing unit 520, the short-T part of the radio frequency signal RF is suitably adjusted to have better symmetry.

Figure 6:
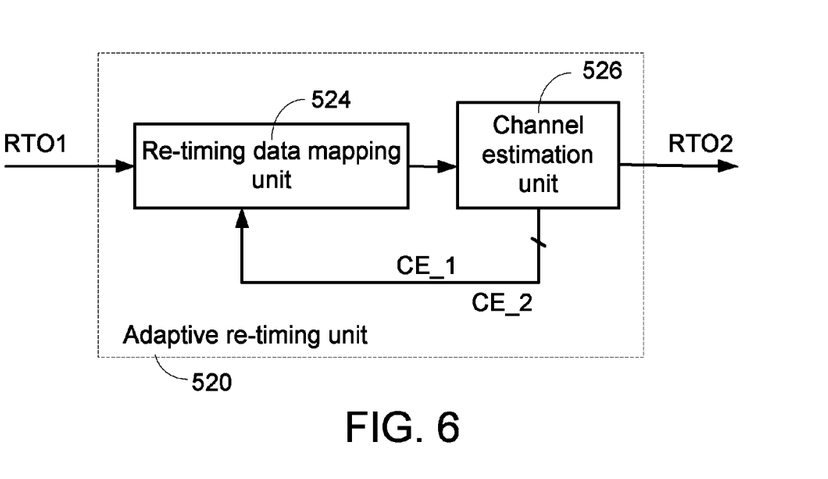
FIG. 6 is a schematic functional block diagram illustrating an exemplary adaptive re-timing unit used in the read channel according to the embodiment of the present invention.

FIG. 6 is a schematic functional block diagram illustrating an exemplary adaptive re-timing unit used in the read channel according to the embodiment of the present invention. The adaptive re-timing unit 520 comprises a re-timing data mapping unit 524 and a channel estimation unit 526. The channel estimation unit 526 issues a first channel estimation value CE_1 and a second channel estimation value CE_2 to the re-timing data mapping unit 524. According to the first channel estimation value CE_1 and the second channel estimation value CE_2, the re-timing output signal RTO1 is converted into the adjusted re-timing output signal RTO2 by the re-timing data mapping unit 524. The operations of the adaptive re-timing unit 520 will be illustrated in more details as follows.

Obviously, since the timing recovery unit 510 is implemented by a digital signal processing circuit, the re-timing output signal RTO1 is consisted of plurality of sampling values. The sampling values of the re-timing output signal RTO1 higher than the zero-crossing reference level ZCRL are positive. Whereas, the sampling values of the re-timing output signal RTO1 lower than the zero-crossing reference level ZCRL are negative.

Figure 7:
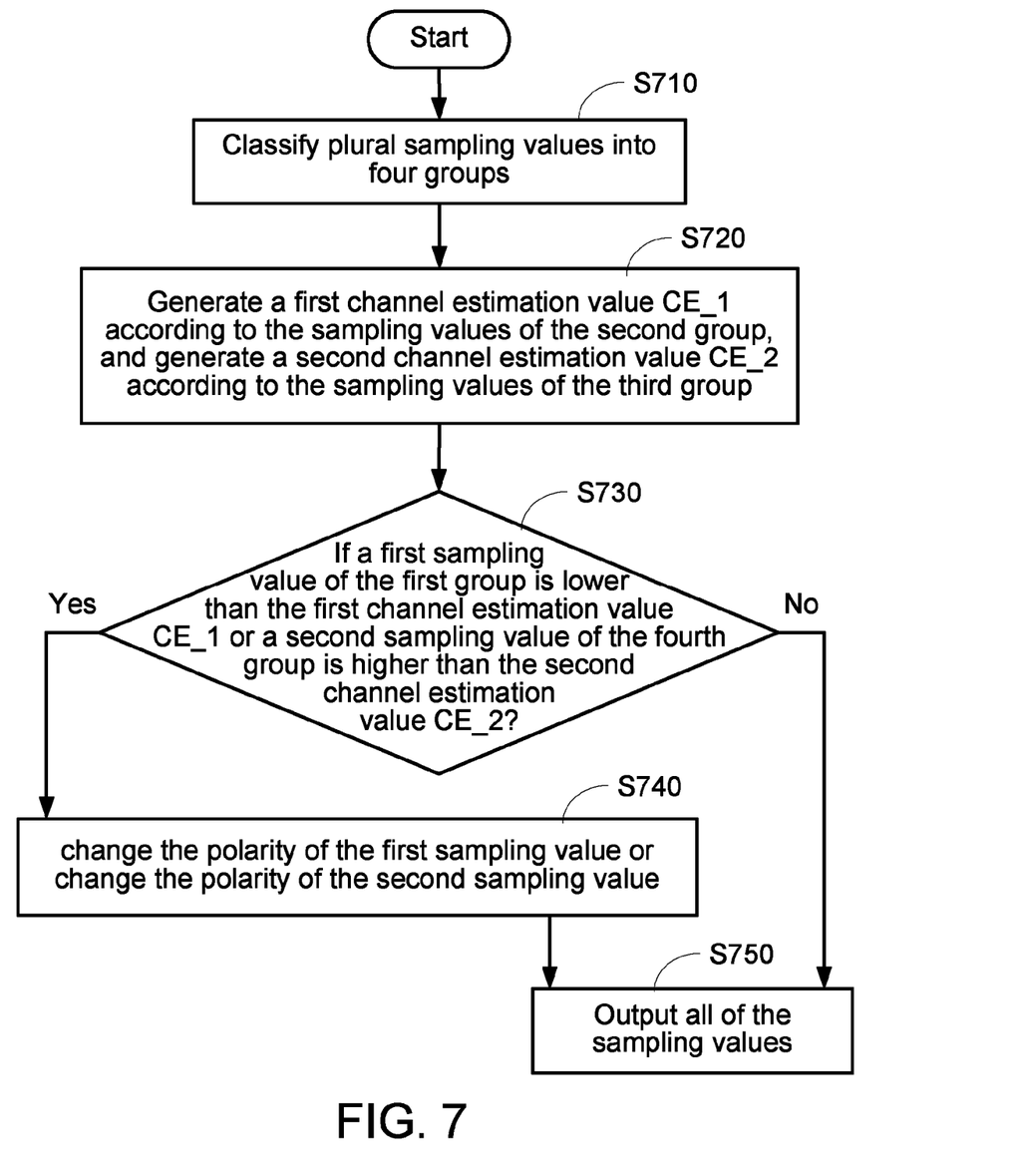
FIG. 7 is a flowchart of a data recovery method according to an embodiment of the present invention.

Please refer to FIG. 7, which schematically illustrates a flowchart of a data recovery method according to an embodiment of the present invention. The data recovery method is directed to the operations of the adaptive re-timing unit 520. Firstly, in the step S710, the plurality of sampling values from the timing recovery unit 510 are received and classified into four groups. That is, the sampling values are classified into four groups by the re-timing data mapping unit 524. A specified sampling value is classified into a specified group according to the two sampling values prior to the specified sampling value and the two sampling values posterior to the specified sampling value. The sampling value belonging to the first group is expressed as "X+++X"; the sampling value belonging to the second group is expressed as "--+++" or "+++--"; the sampling value belonging to the third group is expressed as "---++" or "++---"; and the sampling value belonging to the fourth group is expressed as "X---X". In the above formulae, the symbol "+" denotes a positive polarity of the sampling value, the symbol "-" denotes a negative polarity of the sampling value, and the symbol "X" denotes that the sampling value is negligible.

Then, in the step S720, a first channel estimation value CE_1 is generated according to the sampling values of the second group, and a second channel estimation value CE_2 is generated according to the sampling values of the third group. In an embodiment, the first channel estimation value CE_1 constantly varies according to the formula: $CE\_1_n = CE\_1_{n-1} + a_1 \times (G2_n - G2_{n-1})$. The term $(G2_n - G2_{n-1})$ indicates a difference between a latter sampling value and a former sampling value of the second group. The term $a_1$ denotes a constant weighting coefficient. The term $(G2_n - G2_{n-1})$ multiplied by the constant weighting coefficient denotes an offset. The updated first channel estimation value is equal to the sum of a former first channel estimation value and the offset. In other words, the first channel estimation value CE_1 constantly varies with the sampling values of the second group. Similarly, the second channel estimation value CE_2 constantly varies according to the formula: $CE\_2_n = CE\_2_{n-1} + a_2 \times (G3_n - G3_{n-1})$. In other words, the second channel estimation value CE_2 constantly varies with the sampling values of the third group.

Then, the step S730 is performed to judge whether a first sampling value of the first group is lower than the first channel estimation value CE_1 or a second sampling value of the fourth group is higher than the second channel estimation value CE_2.

If the condition of the step S730, the step S740 is performed to change the polarity of the first sampling value or change the polarity of the second sampling value. That is, the first sampling value is changed from positive to negative or the second sampling value is changed from negative to positive. In some embodiments, the polarity of the first sampling value or the second sampling value is changed, and the first sampling value is changed to the minimum sampling value or the second sampling value is changed to the maximum sampling value. Then, the step S750 is performed to output all of the sampling values.

On the other hand, if the step S730 is not satisfied, the step S750 is performed to directly output all of the sampling values.

From the above discussion, the purpose of the data recovery method of the present invention is to use the first channel estimation value CE_1 and the second channel estimation value CE_2 to find out the asymmetrical short-T parts and then correct the asymmetrical short-T parts into symmetrical short-T parts.

Figure 8:
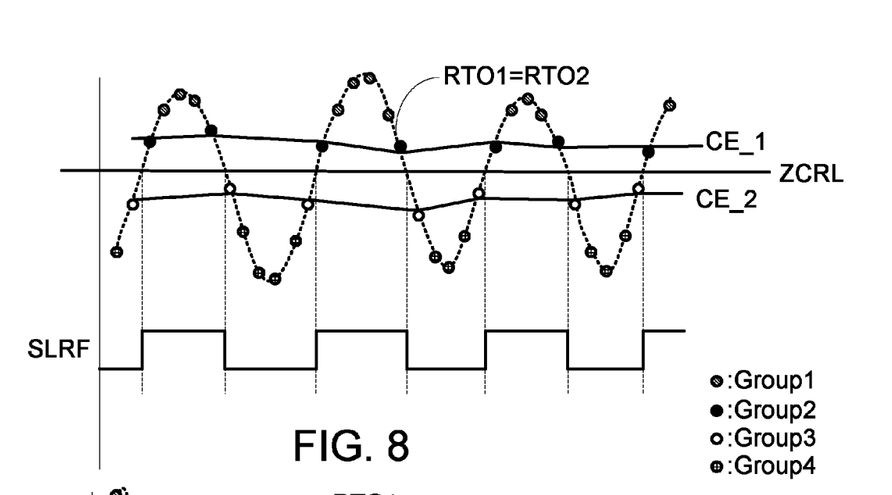
FIG. 8 is a schematic timing waveform diagram illustrating the sampling values obtained from an ideal optical disc.

FIG. 8 is a schematic timing waveform diagram illustrating the sampling values obtained from an ideal optical disc. As shown in FIG. 8, the black dots denote the sampling values of the second group, the white dots denote the sampling values of the third group, the dots above the black dots denote the sampling values of the first group, and the dots below the white dots denote the sampling values of the fourth group. The sampling values of the second group are positive and slightly higher than the zero-crossing reference level ZCRL. The sampling values of the third group are negative and slightly lower than the zero-crossing reference level ZCRL.

According to the sampling values of the second group and the third group, the first channel estimation value CE_1 and the second channel estimation value CE_2 are calculated by the channel estimation unit 526.

As shown in FIG. 8, none of the sampling values of the first group are lower than the first channel estimation value CE_1, and none of the sampling values of the fourth group are higher than the second channel estimation value CE_2. In this situation, it is not necessary to adjust the re-timing output signal RTO1. That is, the adjusted re-timing output signal RTO2 is identical to the re-timing output signal RTO1. After the adjusted re-timing output signal RTO2 is inputted into the signal slicer 530, a sliced radio frequency signal SLRF is outputted from the signal slicer 530.

Figure 9:
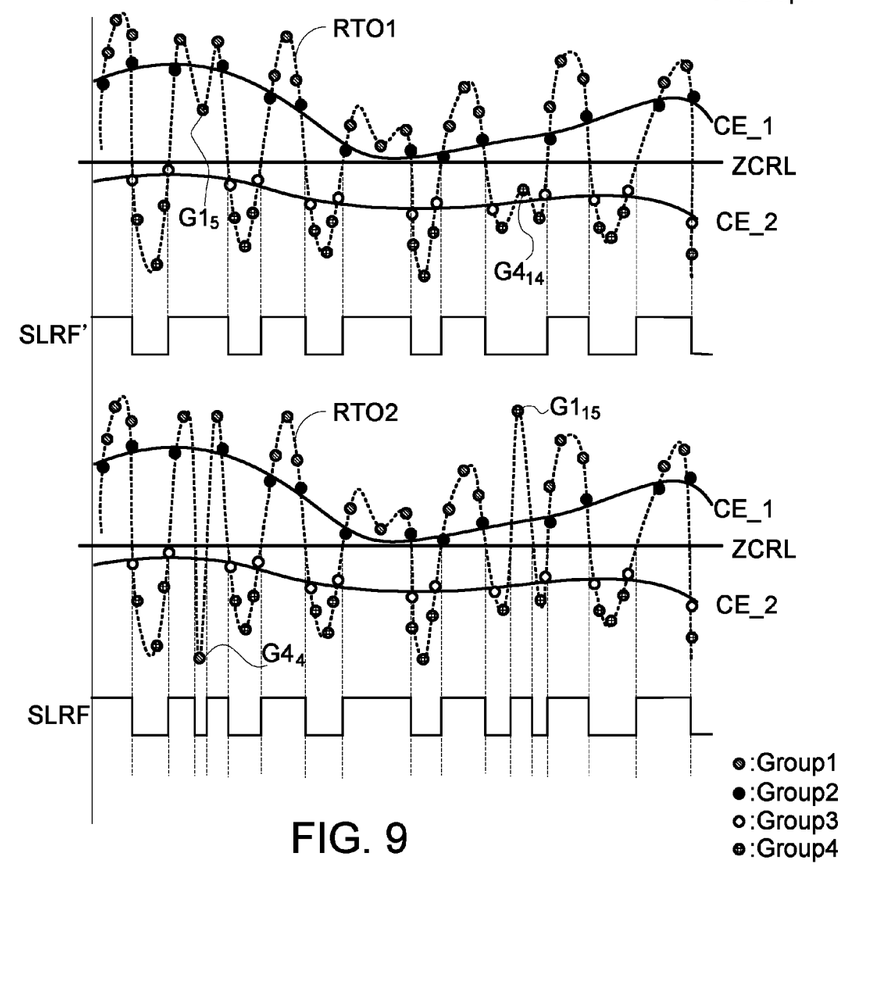
FIG. 9 is a schematic timing waveform diagram illustrating the sampling values obtained from an asymmetrical optical disc.

FIG. 9 is a schematic timing waveform diagram illustrating the sampling values obtained from an asymmetrical optical disc. As shown in FIG. 9, the black dots of the re-timing output signal RTO1 denote the sampling values of the second group, and the white dots of the re-timing output signal RTO1 denote the sampling values of the third group. The sampling values of the second group are positive and slightly higher than the zero-crossing reference level ZCRL. The sampling values of the third group are negative and slightly lower than the zero-crossing reference level ZCRL. According to the sampling values of the second group and the third group, the first channel estimation value CE_1 and the second channel estimation value CE_2 are calculated by the channel estimation unit 526. Assume that if the re-timing output signal RTO1 is inputted into the signal slicer 530, a sliced radio frequency signal SLRF' is shown for comparison with the real sliced radio frequency signal SLRF.

As shown in FIG. 9, a sampling value $G1_5$ is lower than the first channel estimation value CE_1. Consequently, the sampling value $G1_5$ is changed to a negative value $G4_4$ by the re-timing data mapping unit 524. In addition, a sampling value $G4_{14}$ of the fourth group is higher than the second channel estimation value CE_2. Consequently, the sampling value $G4_{14}$ is changed to a positive value $G1_{15}$ by the re-timing data mapping unit 524. For example, in a case that the sampling values are expressed in an 6-bit 2's complement number system, the sampling value $G1_5$ is changed to −32 ($G4_4$), and the sampling value $G4_{14}$ is changed to +31 ($G1_{15}$).

After the sampling value $G1_5$ and the sampling value $G4_{14}$ are changed, the sampling values are outputted as the adjusted re-timing output signal RTO2. After the adjusted re-timing output signal RTO2 is inputted into the signal slicer 530, a sliced radio frequency signal SLRF is outputted from the signal slicer 530.

In practice, the occurrence of the sampling value $G1_5$ and/or the sampling value $G4_{14}$ may cause asymmetry of the short-T part. Since the polarities of these sampling values are changed by the data recovery method of the present invention, the symmetry of the short-T part is enhanced, and the sliced radio frequency signal SLRF is no longer erroneously generated.

Figure 10:
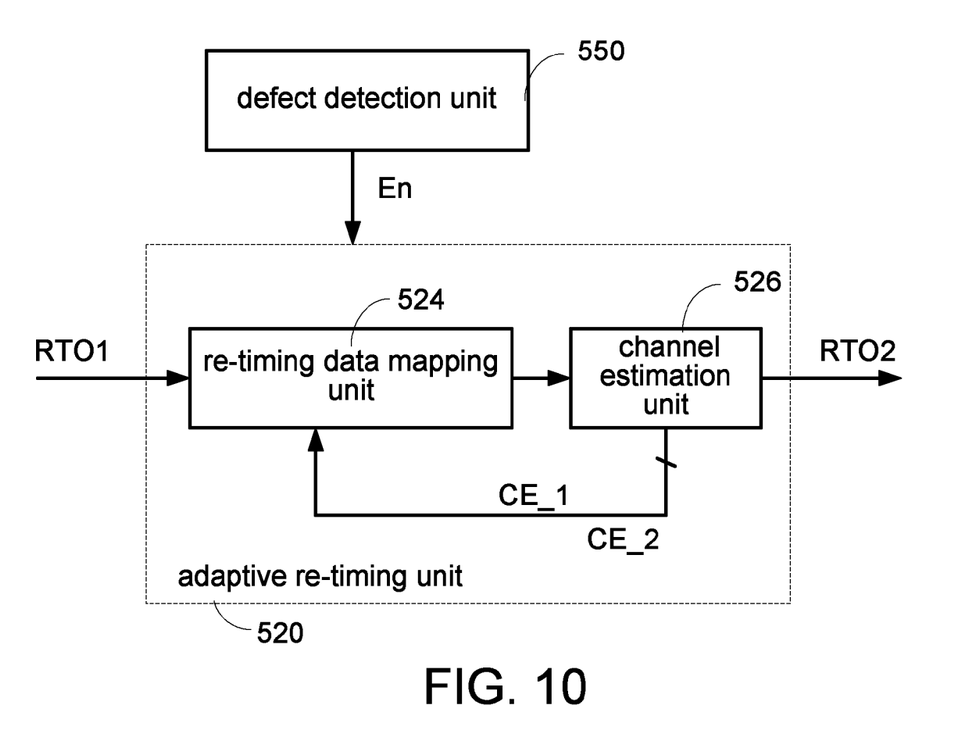
FIG. 10 is a schematic functional block diagram illustrating a defect detection unit in cooperation with the adaptive re-timing unit.

In a case that the track of the optical disc is not defective, the radio frequency signal RF generated by the optical pickup head is suffered from distortion. Under this circumstance, the adaptive re-timing unit 520 should be disabled to prevent from the data recovery operation. Please refer to FIG. 10, which is a schematic functional block diagram illustrating a defect detection unit 550 in cooperation with the adaptive re-timing unit. As shown in FIG. 10, an enabling signal En from a defect detection unit 550 may be received by the adaptive re-timing unit 520. In a case that the optical disc is not defective, the enabling signal En is continuously issued to the adaptive re-timing unit 520 and thus the adaptive re-timing unit 520 is enabled. In response to the enabling signal En, the re-timing output signal RTO1 is converted into the adjusted re-timing output signal RTO2 by the adaptive re-timing unit 520.

Whereas, in a case that the track of the optical disc is defective, the defect detection unit 550 disables the adaptive re-timing unit 520, and thus the operations of the adaptive re-timing unit 520 are stopped. In this situation, the re-timing output signal RTO1 is not converted into the adjusted re-timing output signal RTO2. As known, other methods and devices may be used to detect whether the track of the optical disc is defective. The operating principles of the defect detection unit 550 are well known to those skilled in the art, and are not redundantly described herein.

From the above description, the present invention relates to a data recovery method and a data recovery device for use with an optical storage system. The data recovery method and a data recovery device are effective to adjust the asymmetric short-T part (e.g. 3T, 4T or 5T part) to more symmetrical and enhance the accuracy of the sliced radio frequency signal SLRF without adversely affecting the long-T part of the radio frequency signal.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data recovery method executed by a digital signal processing circuit for receiving a plurality of sampling values from a timing recovery unit of a read channel of an optical storage system, the data recovery method comprising steps of:
    classifying the plurality of sampling values into a first group, a second group, a third group and a fourth group;
    generating a first channel estimation value according to the sampling values of the second group, and generating a second channel estimation value according to the sampling values of the third group; and
    judging whether a first sampling value of the first group is lower than the first channel estimation value or a second sampling value of the fourth group is higher than the second channel estimation value,
    wherein if the first sampling value of the first group is lower than the first channel estimation value or the second sampling value of the fourth group is higher than the second channel estimation value, a polarity of the first sampling value or the second sampling value is changed and then the plurality of sampling values are outputted,
    wherein if the first sampling value of the first group is higher than or equal to the first channel estimation value or the second sampling value of the fourth group is lower than or equal to the second channel estimation value, the plurality of sampling values are directly outputted.

2. The data recovery method as claimed in claim 1, wherein a third sampling value of the plurality of sampling values is classified into one of the first group, the second group, the third group and the fourth group according to the two sampling values prior to the third sampling value and the two sampling values posterior to the third sampling value.

3. The data recovery method as claimed in claim 2, wherein if the third sampling value, the sampling value prior to the third sampling value and the sampling value posterior to the third sampling value are all positive, the third sampling value is classified into the first group; wherein if the third sampling value and the two sampling values prior to the third sampling value are all positive and the two sampling values posterior to the third sampling value are both negative, the third sampling value is classified into the second group; wherein if the third sampling value and the two sampling values posterior to the third sampling value are all positive and the two sampling values prior to the third sampling value are both negative, the third sampling value is classified into the second group; wherein if the third sampling value and the two sampling values prior to the third sampling value are all negative and the two sampling values posterior to the third sampling value are both positive, the third sampling value is classified into the third group; wherein if the third sampling value and the two sampling values posterior to the third sampling value are all negative and the two sampling values prior to the third sampling value are both positive, the third sampling value is classified into the second group; and wherein if the third sampling value, the sampling value prior to the third sampling value and the sampling value posterior to the third sampling value are all negative, the third sampling value is classified into the fourth group.

4. The data recovery method as claimed in claim 3, wherein if the first sampling value of the first group is higher than the first channel estimation value or the second sampling value of the fourth group is lower than the second channel estimation value, the first sampling value is changed to a minimum sampling value with a negative polarity or the second sampling value is changed to the maximum sampling value with a positive polarity.

5. The data recovery method as claimed in claim 1, wherein the first channel estimation value changes with the sampling values of the second group, and the second channel estimation value changes with the sampling values of the third group.

6. The data recovery method as claimed in claim 5, wherein if a fourth sampling value belongs to the second group, a difference between the fourth sampling value and a former sampling value belonging to the second group is multiplied by a weighting coefficient to obtain an offset, wherein a sum of the first channel estimation value and the offset is defined as an updated first channel estimation value.

7. The data recovery method as claimed in claim 1, wherein after the plurality of sampling values are received by a signal slicer of the read channel, a sliced radio frequency signal is outputted from the signal slicer.

* * * * *